United States Patent [19]
Serratto

[11] 4,088,150
[45] May 9, 1978

[54] VALVE FOR THE AUTOMATIC FLOW CONTROL OF A FLUID IN A CONDITIONING SYSTEM

[76] Inventor: Angelo Serratto, C. So Indipendenza 5, Milan, Italy

[21] Appl. No.: 711,275

[22] Filed: Aug. 3, 1976

[30] Foreign Application Priority Data

Aug. 5, 1975 Italy .................. 26146 A/75

[51] Int. Cl.² ........................................... F16K 31/12
[52] U.S. Cl. .................................. 137/499; 137/521; 137/514; 137/527; 251/306
[58] Field of Search ............... 137/499, 521, 527, 514; 251/305, 306

[56] References Cited

U.S. PATENT DOCUMENTS

| | | | |
|---|---|---|---|
| 2,890,717 | 6/1959 | Werder | 137/521 |
| 2,946,554 | 7/1960 | Asker | 251/306 |
| 3,060,960 | 10/1962 | Waterfill | 137/514 |
| 3,452,762 | 7/1969 | Fabre | 137/499 |
| 3,538,945 | 11/1970 | Dean | 137/499 |

*Primary Examiner*—Alan Cohan
*Attorney, Agent, or Firm*—Rose & Edell

[57] ABSTRACT

A valve for the automatic flow control of a fluid in a conditioning system comprises as air lock means a tab rotatably mounted in a valve body, associated with a dampering device and a means for opposition to tab oscillations. The dampering device comprises a first rod mounted on the rotary shaft of the tab, fixed to a reactor gear meshing with a flywheel. The oscillation opposing means comprises a second rod fixed to the first rod and connected to the valve body by adjustable spring means. A fixed baffle is provided at the lower portion of the valve body, under the rotatable tab.

9 Claims, 7 Drawing Figures

VALVE FOR THE AUTOMATIC FLOW CONTROL OF A FLUID IN A CONDITIONING SYSTEM

BACKGROUND OF THE INVENTION

The present invention relates to a valve for the automatic flow control of a fluid in a conditioning system.

More in particular the present invention relates to a valve for keeping at a constant value the flow of a fluid, generally air, in a conditioning system, when the pressure of the fluid varies.

A conditioning system comprises a feeding station connected with an air distributing system, comprising a multiplicity of branches, each of which is associated with a terminal conduit wherein a control valve is provided. As is known, the number of the open terminal conduits may be very different according to the requirements of each room where an end conduit is installed, and one or more of such conduits being closed results in a pressure variation in the other conduits. It is therefore necessary to assure, by means of a control device mounted in such end conduits, that the air flow is kept at the same value when the pressure values of the remaining portion of the system are varying. By way of example the pressure within the system may vary from a minimum of 20 mm of water to a maximum of 200 mm of water.

PRIOR ART

At present two basic types of valves for the automatic control of air flow in a conditioning system are provided.

A first type provides, in the end conduit, a resilient diaphragm generally of rubber, which is adapted to change its shape as a function of pressure variations, in opposition to a spring associated to an adjustment screw for calibrating the valve at the desired flow quantity.

Valves of this type show the serious drawback of having a short duration due to the particular air lock means employed. This drawback above all results from the use of the valve during the winter season when hot air passes through the valve.

A second valve for the automatic control of the above-mentioned type comprises a throttle valve, wherein to the locking means there is fixed a tab adapted to control, as a function of the pressure variations, corresponding variations of the locking means portions; there being also provided a balancing device comprising a counterweight operating on the air lock means for the calibration of the valve and a dampering device, in general a cylinder-piston unit, to damper the possible oscillations which can be caused in the movement of the air lock means. A valve of this type is described in the Italian Pat. No. 771,907.

A first drawback shown by the valves of this type derives from the fact that they have to be always mounted in a horizontal position due to the presence of the counterweight.

Another drawback shown by said valves derives from the fact that they do not allow the complete locking of the air flow through the end conduit, thus requiring an auxiliary interception means.

A further drawback derives from the fact that, when a cylinder-piston unit is provided as a dampering means unit, heavy weights are required to be attached to the locking means to ensure a sufficient efficiency of the valve operation.

SUMMARY OF THE INVENTION

It is therefore an object of the present invention to provide a valve for the automatic control of the air flow within an end conduit of a conditioning system, which valve operates to avoid not only the drawbacks of the valves of the above-mentioned first type, but also those of the valves of the second type.

The automatic valve for controlling the air flow in an end conduit of a conditioning system according to the present invention is therefore characterized by the fact that the dampering device for dampering the oscillations of the tab comprises a rod mounted on the pivoting axis of the tab and is provided at an end with a sector gear meshing with a flywheel pivotedly mounted on the valve body, and the fact that the balancing device comprises the extension of said rod, connected to the valve body by adjustable spring means, these being finally provided means for adjusting the initial position of said rod and thereby of the tab.

A first advantage of the valve according to the invention consists in the fact that the counterweight is no longer necessary. It is therefore possible to employ the valve in any orientation without requiring particular arrangements.

Another advantage of said valve is due to the fact that, as it will be clearer in the following, by means of the above-mentioned dampering device, the diagram of the moments applied to the tab is an exponential curve as a function of the various positions of the tab itself and of the pressure variations.

A further advantage shown by the valve of the present invention consists in the easiness by which it can be adjusted, in particular also after its installation.

BRIEF DESCRIPTION OF THE DRAWINGS

These and further advantages and the features of the valve according to the invention will result more clearly from the following detailed description of an embodiment given by way of example with reference to the annexed drawings, wherein.

DETAILED DESCRIPTION OF THE PREFERRED EMBODIMENT

Figure 1:
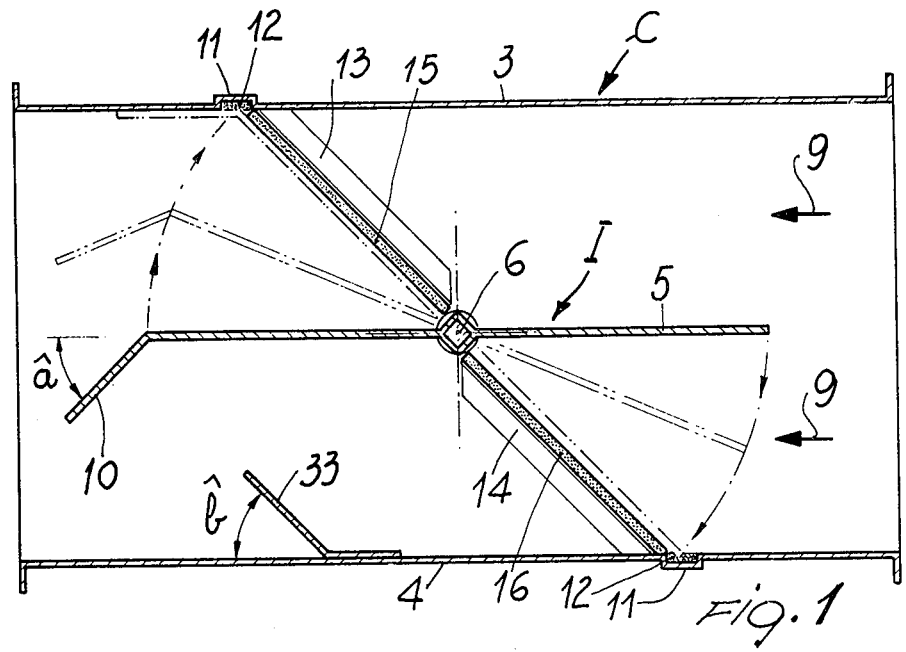
FIG. 1 is a cross-sectional view of the valve according to the invention.
Figure 2:
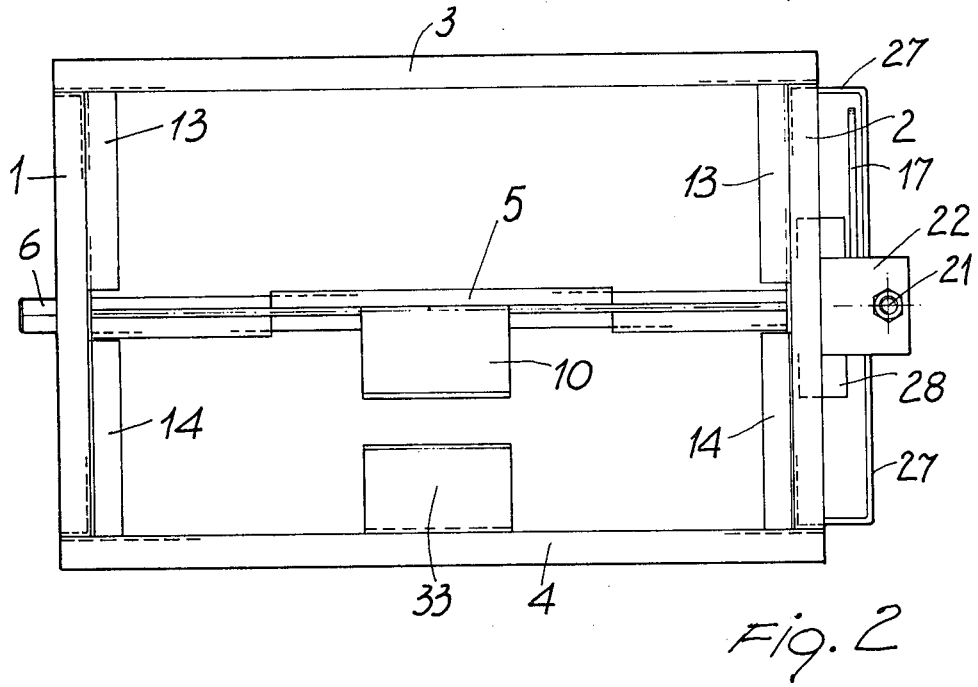
FIG. 2 is a front view of said valve from the air outflow side.
Figure 4:
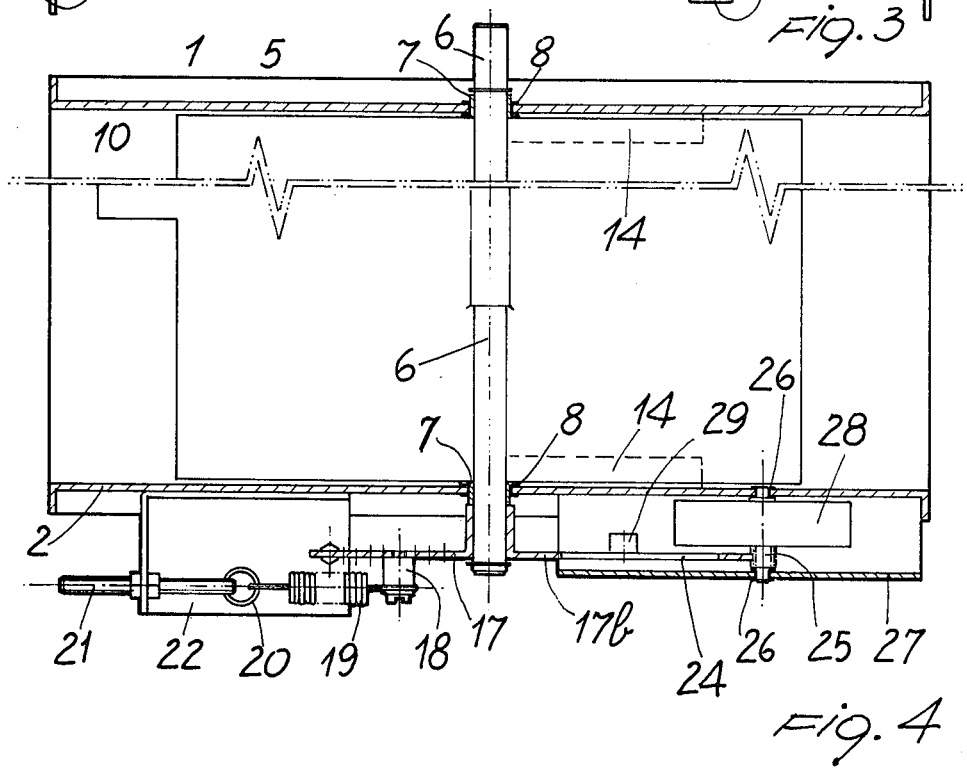
FIG. 4 is a plan view of FIG. 3.

With particular reference to FIGS. 1, 2 and 4, the valve of the present invention is comprised of a valve body C within which an air lock device I for intercepting the air flow is mounted. The valve body C has a parallelepiped shape and is formed by two side walls 1, 2 mutually connected by two transverse walls 3, 4. The locking means I comprises a tab 5 with its central zone fixed to a shaft 6 capable of rotating with respect to the side walls 1, 2 by means of bushings 7 and anti-friction sleeves 8. The shaft 6 is placed symmetrically with respect to the inlet edge and outlet edge of air. The air enters at an end in the direction of the arrows 9 and flows out from the opposite end, upon impinging the tab 5. The latter is provided, at the end opposite to the end facing to the air inlet, with a dependent member 10 comprising a rectangular baffle bent toward the transverse wall 4 and forming with the plane of the tab 5 an angle $â$ of 45°. As it is noted in particular in FIG. 2, the dependent member 10 is centrally placed on the tab 5 and thereby has the same distance from the side walls 1, 2. The dependent member 10 is made integral with the tab 5.

With particular reference to FIG. 1, the transverse walls 3, 4 are provided with recesses 11 having rectangular cross-section, each of which having a rubber strip 12 fixed therein. The position of the recesses 11 is such that the ends of tab 5 rest on the strips 12 whenever the tab 5 is in the closed portion. In this way a sealing gasket is obtained, which causes the air flow to be completely blocked. In order to complete the air-tight seal at the "closed" position, on the side walls 1, 2 there are provided ledges 13, 14 to which the tab 5 abuts with its side edges when it is placed at the "closed" position.

Figure 3:
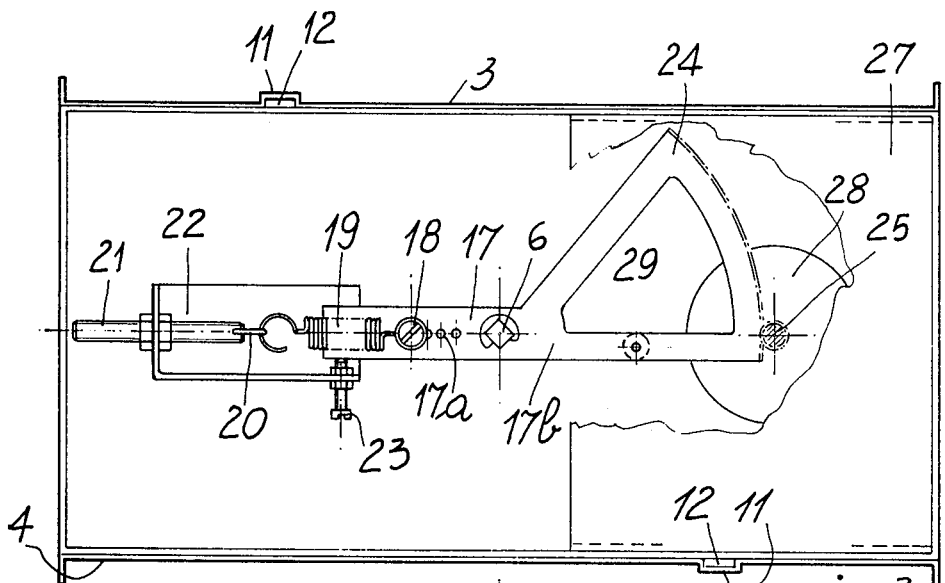
FIG. 3 is a side view of the valve, showing the dampering device.

With particular reference to FIGS. 3 and 4 there is shown the counter-balancing device which replaces the usual counterweight of the valves of known type. This counterbalancing device comprises a rod 17 fixed to the shaft 6 and placed, with respect to the latter, toward the end of air outflow from the valve. The rod 17 is provided with a plurality of threaded holes 17a within which an adjustable pin 18 can be fixed.

To the pin 18 there is fixed an end of a spring 19 whose other end is inserted in a ring 20 fixed to a screw 21 being screwed to a bracket 22, which in turn is integral to the side wall 2. A screw 23 is also screwed on the bracket 22 and thereon the end of rod 17 rests. The screw 23 causes the initial position of the tab 5 to be adjusted, thus allowing it to take a position at a slight angle with respect to the position parallel to transverse walls 3, 4. Generally the tab 5 is given an initial slope of about 5° in a clockwise direction to the above-mentioned position.

Referring again to FIGS. 3 and 4 there is now described the dampering device adapted to damper the possible oscillations which might be caused in the movements of the tab 5 as a consequence of sudden variations of pressure values. This dampering device comprises a rod 17b having a sector gear 24 meshing with a pinion 25 supported, by means of anti-friction sleeves 26, by the side wall 2 at one end and by a C-shaped support 27 at the other end, the support 27 being fixed to the side wall 2. Pinion 25 is fixed to a flywheel 28 of the same type already employed in the known valves, the prior art fly wheel, however, being directly mounted on the shaft 6 on which the tab 5 is fixed. The present inventive arrangement of the dampering device allows a good operation stability even though the flywheel 28 is of small size, thanks to the over-gear device given by the sector gear 24 meshing with pinion 25. It has been found that, even with high and sudden pressure variations, the dampering device strongly limits the oscillations of tab 5. A mass 29 is finally applied onto the rod 17b in order to balance, in relation to the rotation axis of the tab 5, the weight of dependent member 10 and possible further unbalanced weights. In this way the assembly is completely balanced and particularly suitable to operation even in a position different from the horizontal.

Figure 6:
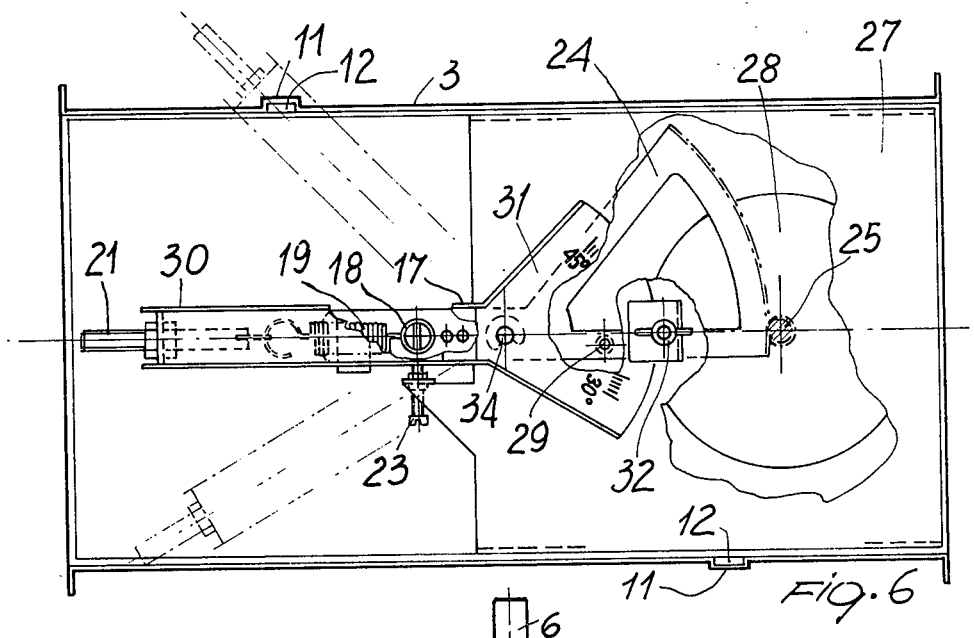
FIGS. 6 and 7 are side and plan views showing a different embodiment of the dampering device.
Figure 7:
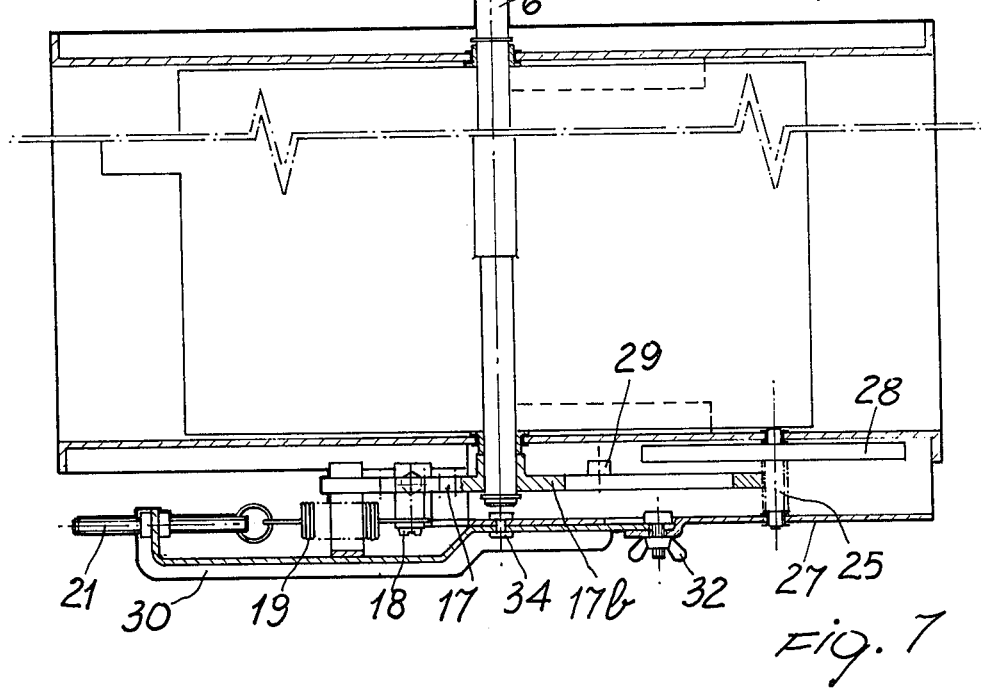

With particular reference to FIGS. 6 and 7 there is shown a different embodiment according to which the adjustment screw 21 is mounted on a movable bracket 30 hinged to support 27 by a pivot 34 and can be fastened at prefixed positions on said support by means of a wing nut 32. The end of bracket 30 nearer to the air inlet into the valve has a triangular shape and has an indexed scale between 30° and 45°; the end to the outlet of the air from the valve is substantially rectilinear. The rotation of the movable bracket 30 may be performed by hand or automatically, by whichever suitable means. For example upwards rotations of about 45° and downwards rotations of about 30°–35° can be obtained (positions shown by dashed lines). By this operation the return spring 19 is stretched or released as in the preceding case.

With particular reference to FIGS. 1 and 2 the valve of the present invention finally comprises, at the lower portion of the valve body C, a baffle 33 having a side fixed to the transverse wall 4 and the other side forming with the latter an angle $b$ of 45°. As it is understood in particular from FIG. 2, baffle 33 is placed under the depending member 10 and has the same width thereof. The baffle 33 serves to guide upwards, under the dependent member 10, the air from the feeding system, while co-operating with member 10 to control the rotation of tab 5.

Figure 5:
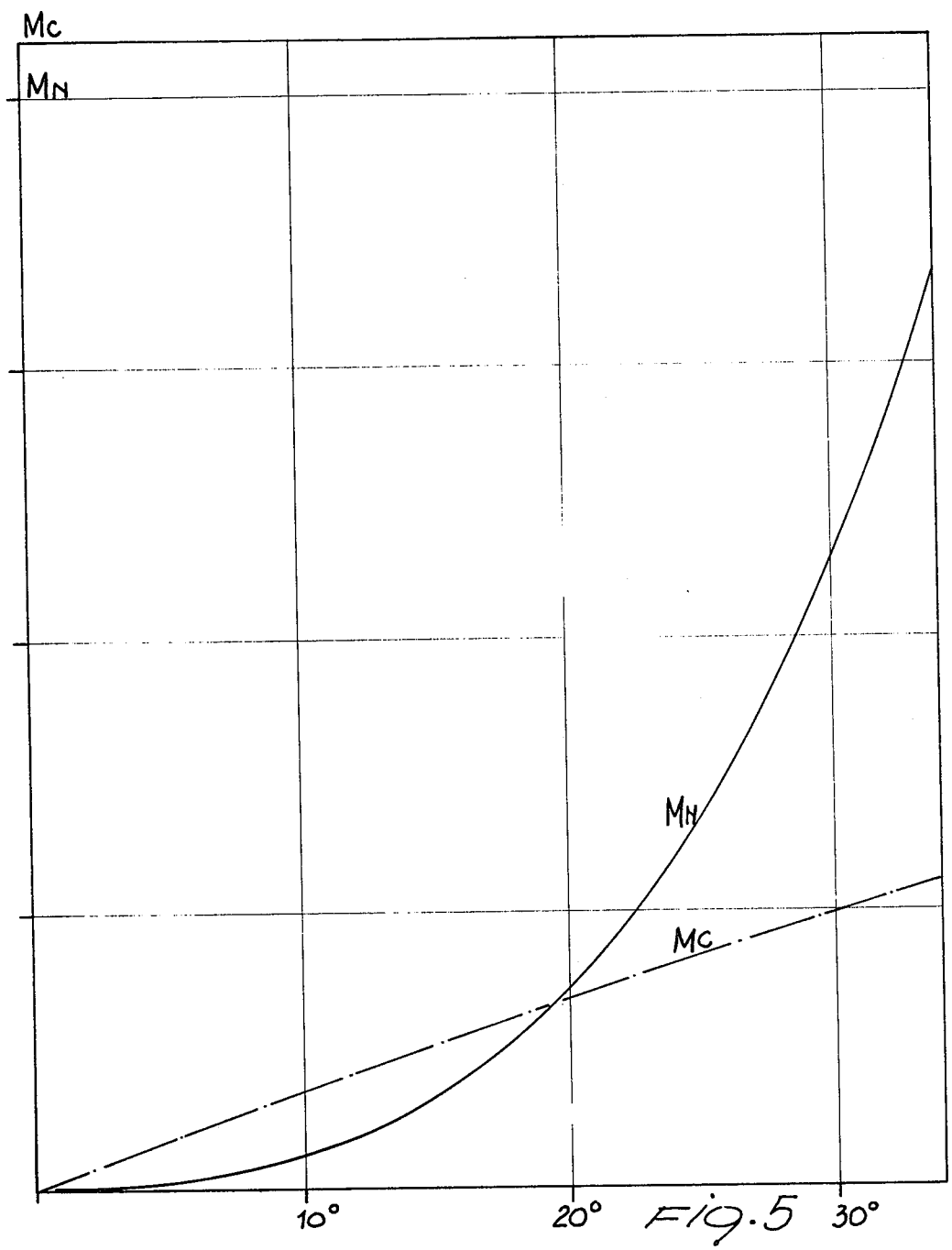
FIG. 5 is a diagram showing how some quantities relating to the valve are varying as a function of the position of the tab.

FIG. 5 shows the diagrams of the moments applied to the tab 5 as a function of the angular variations of the tab itself. Such variations are comprised between 0° (horizontal tab) and 35° (position near to closed tab). $M_C$ identifies the moment curve of a valve of known type with counterweight, whereas $M_N$ shows the moment curve for the valve of the invention. From these curves the unique operating efficiency of the valve is clear according to the invention, particularly in the zone between 20° and 35°, that is the zone of the most frequent use.

It is a peculiar feature of the valve according to the invention the fact that, as the angle of inclination of the tab 5 increases, the most part of air passes over the tab 5 itself, with the consequence of a decreasing pressure from the lower edge to the upper edge and a high pressure at the front side of tab 5, if it is considered as front side of the tab the portion impinged by the air entering the valve. This results in a vacuum at the depending member 10, which causes tab 5 to rotate in a counter-clockwise direction.

Variations and/or changes could be performed into the valve of the present invention without therefor exceeding the scope of the invention itself as defined in the appended drawings.

What I claim is:

1. A valve for automatically controlling air flow in a conduit such that the air flow remains substantially constant over a wide range of air pressure variations in the conduit, said valve comprising:

a valve body adapted to be connected to said conduit such that air flowing through said conduit also flows through the valve body;

a shaft having a longitudinal axis and extending entirely through said valve body transversely of said air flow;

means securing said shaft to said valve body for rotational motion about said longitudinal axis;

a tab member extending radially from said shaft within said valve body and fixedly secured to said shaft so as to be rotatable therewith about said longitudinal axis;

a rigid rod having first and second ends and having a sector gear at said first end;

means for securing said rod, at a location intermediate said first and second ends, to said shaft along the outside of said valve body such that said rod extends perpendicular to said longitudinal axis and is rotatable thereabout with said shaft, and such that longitudinal movement of said rod is precluded;

spring means secured between said valve body and a location on said rod which is closer than said shaft to said second end, for biasing said rod toward said second end;

a pinion rotatably secured to the outside said valve body such that it meshes with said sector gear;

a flywheel mounted outside said valve body about said pinion to be rotatable therewith; and adjustable means for rotatably positioning said rod, and thereby said tab, an initial position.

2. An automatic valve according to claim 1, wherein at the lower portion within the valve body a baffle is provided, which is adapted to guide upwards the air entering the valve.

3. An automatic valve according to claim 1, wherein gaskets are provided at an abutting zone between said tab and said valve body.

4. An automatic valve according to claim 1, provided with a dependent member for controlling said tab, wherein said dependent member is formed integral with the tab.

5. An automatic valve according to claim 1 wherein is provided further means for selectively varying the bias applied to said rod by said spring means, said further means comprising a plurality of openings disposed along said rod between said shaft and said secured end, and a pin member secured to said spring means and adapted to engage each of openings individually.

6. An automatic valve according to claim 5 wherein is further provided a movable bracket pivotedly mounted on the outside of said valve body, and wherein said spring means is secured to said movable bracket.

7. An automatic valve according to claim 6, wherein the movable bracket can be fastened at prefixed positions to the valve body.

8. An automatic valve according to claim 6 wherein said adjustable means comprises a screw member positioned on said movable bracket to apply torque to said rod about said longitudinal axis, said screw member being adjustably positionable to vary said torque.

9. An automatic valve according to claim 5 wherein said adjustable means comprises a screw member positioned at a fixed location with respect to said valve body to apply torque to said rod about said longitudinal axis, said screw member being adjustably positionable to vary said torque.

* * * * *